United States Patent [19]
Dempster

[11] Patent Number: 5,177,921
[45] Date of Patent: Jan. 12, 1993

[54] LOW LEAKAGE GLAZING SYSTEM

[75] Inventor: William F. Dempster, Oracle, Ariz.

[73] Assignee: Space Biospheres Venture, Oracle, Ariz.

[21] Appl. No.: 481,915

[22] Filed: Feb. 16, 1990

[51] Int. Cl.$^5$ .............................................. E04B 1/61
[52] U.S. Cl. ...................................... 52/397; 52/281; 52/395; 52/769
[58] Field of Search .................. 52/395, 397, 80, 393, 52/235, 769, 483, 488, 489, 276, 277, 278, 281

[56] References Cited

U.S. PATENT DOCUMENTS

| | | |
|---|---|---|
| Re. 30,432 | 11/1980 | Stoakes . |
| 1,513,810 | 11/1924 | Hawes . |
| 1,772,068 | 8/1930 | Cibulas . |
| 3,367,077 | 2/1968 | Johnston ........................ 52/397 |
| 3,462,893 | 8/1969 | Kaiser ............................... 52/80 |
| 3,785,104 | 1/1974 | Dailen ............................. 52/235 |
| 4,215,675 | 8/1980 | Embree . |
| 4,471,584 | 9/1984 | Dietrich . |
| 4,500,572 | 2/1985 | Francis . |
| 4,552,790 | 11/1985 | Francis . |
| 4,557,089 | 12/1985 | Breithaupt . |
| 4,581,868 | 4/1986 | McCann . |
| 4,640,072 | 2/1987 | Muhle . |
| 4,704,839 | 11/1987 | Kay . |
| 4,724,637 | 2/1988 | Evans . |
| 4,799,344 | 1/1989 | Francis . |
| 4,813,203 | 3/1989 | Newman et al. . |

FOREIGN PATENT DOCUMENTS

| | | |
|---|---|---|
| 0268829 | 10/1987 | European Pat. Off. . |
| 3715228 | 5/1987 | Fed. Rep. of Germany . |
| 1142691 | 4/1957 | France . |
| 1157253 | 5/1958 | France ............................ 52/395 |
| 2346509 | 10/1977 | France . |
| 328976 | 5/1958 | Switzerland . |

Primary Examiner—Michael Safavi
Attorney, Agent, or Firm—Christie, Parker & Hale

[57] ABSTRACT

The substantially leak proof glazing system comprises a plurality of sheets of glazing material assembled on a reticulated space frame. Rather than sealing the glazing material to the supporting structure, there is a gasket bridging the gap between adjacent sheets of glazing material and sealing against the inside faces of the sheets to provide a glass-to-glass seal. The gasket has a generally U-shaped transverse cross section with the rounded end of each leg of the U bearing against the face of the glazing material. Belleville springs are provided for resiliently biasing the glazing material toward the gasket to compensate for compression set of the gasket. A Belleville spring is also used for compressing the base of the gasket against an underlying support to provide a reliable seal around a stud that penetrates the gasket for supporting the Belleville springs. The gasket is assembled from extruded linear sections bonded to node sections at the corners of sheets of glazing material so that, in effect, there is a large reticulated gasket for the entire glazing system.

21 Claims, 7 Drawing Sheets

LOW LEAKAGE GLAZING SYSTEM

FIELD OF THE INVENTION

The present invention relates generally to the field of glazing systems and in particular to a system having a substantially air tight seal. Means are provided for detecting leakage.

BACKGROUND OF THE INVENTION

The Earth itself comprises a biosphere in which microorganisms, plants, and animals, including humans, exist in a more or less steady state, wherein matter is a finite resource which is continually recycled. There is continual energy input in the form of solar radiation. The quantity of matter gained or lost to space outside the Earth's atmosphere is minute. Thus, the Earth is a closed ecological system which may be referred to herein as Biosphere I.

It is desirable to provide a microcosm of the biosphere known as Earth for study of the interaction of components, and development of techniques for influencing our environment. Such experiments are difficult at best in the open system provided on Earth, where matter is exchanged between the Earth's environment and the experiment itself. It is, therefore, desirable to provide a system that is completely enclosed so that no matter is exchanged with the Earth's environment.

There is, therefore, being established near Oracle, Ariz., a completely closed ecological system referred to as Biosphere II. The system completely encloses about one hectare of land and 142,000 cubic meters of space isolated from the Earth's environment by an impermeable skin so that no matter is transferred. The above ground portion of the skin is transparent glass for receiving solar radiation. Electrical energy is provided to the closed system, and heat may be transferred to or from the system as required. Thus, the Biosphere II closed ecological system is closed as to matter, but open as to energy. For meaningful research, it also remains open for transfer of information.

The closed system should maintain an atmosphere with a composition suitable as a habitat for humans and other animals. For example, it is important to maintain the carbon dioxide concentration in the atmosphere within the closed ecological system within limits that are tolerable by the human and other animal occupants of the system, and provide for a desired steady state growth of plants for providing edible biomass and recyclable carbonaceous materials. To study the effects of various factors on the environment in the system it is of great importance that the impermeable skin of Biosphere II remain substantially completely sealed so that there is virtually no exchange of air between the inside and outside of the system.

The Biosphere II closed system has a large steel space frame erected on a concrete foundation. The space frame serves as support for a safety glass glazing system which provides the impermeable skin for the system. While glazing systems for use with space frame structures are known, a need exists for a glazing system providing an environmentally isolated enclosure which is virtually free of any gas leakage.

It is desired that the glazing system have a leakage rate not exceeding 1% per year of the enclosed volume of air for a period of many years. Considering the size of the structure and the miles of seals along the edges of glazing panels, this is a formidable challenge. An effective system should comprise panels and attachment elements capable of being mounted easily, quickly and safely to space frame structures and involve uncomplicated mounting structures and procedures. An effective system should also provide means to enable the detection of air seepage through the seals in the event it should occur.

The basic problem to be solved is to achieve air-tight seals between adjacent materials which may move with respect to each other. Such movement is due to thermal expansion and contraction, and to structural stresses such as are induced by wind-loading. One approach to solving this problem is to employ a sticky, flexible material to fill the moving joints. It is questionable, however, that available materials will remain flexible and in perfect adherence indefinitely. The best of the materials is probably a silicone resin, because it does not degrade appreciably by weathering or sun-light exposure for very long times, but it is uncertain whether the liquid-applied silicone adhesives can be reliably applied to form and maintain air-tight adhesion.

Glazing systems are customarily designed for preventing water leakage, which is a relatively easier task than preventing gas leakage. Water has surface tension which largely prevents it from entering minute crevices or holes. It also flows downhill while gas can follow any passage, no matter how long or convoluted. Because of such differences, the architectural glazing industry uses designs intended to keep rain out, and has very little experience applicable to the problem of air leakage.

SUMMARY OF THE INVENTION

Thus, in practice of this invention according to a presently preferred embodiment, there is provided a glazing system comprising a pair of sheets of glazing material with an elongated elastomeric gasket having a generally U-shaped transverse cross section bridging the gap between the adjacent edges of the sheets. The edge of one leg of the gasket bears against a face of one sheet of the glazing material and the edge of the other leg of the gasket bears against the face of the other sheet of glazing material. Means are provided for resiliently biasing the gasket toward engagement with the faces of the sheets of glazing material to compensate for any "set" which the gasket material may take.

The glazing material is supported on a metal frame inside the structure overlapped by the edges of the sheets. The gasket forms a continuous seal between adjacent sheets of glazing material with the gasket biased toward the metal frame by a spring loaded clamping member outside the structure.

BRIEF DESCRIPTION OF THE DRAWINGS

The foregoing and other features and advantageous of the present invention will be appreciated as the same becomes better understood by reference to the following detailed description when considered in connection with the accompanying drawings in which.

DETAILED DESCRIPTION

Figure 1:
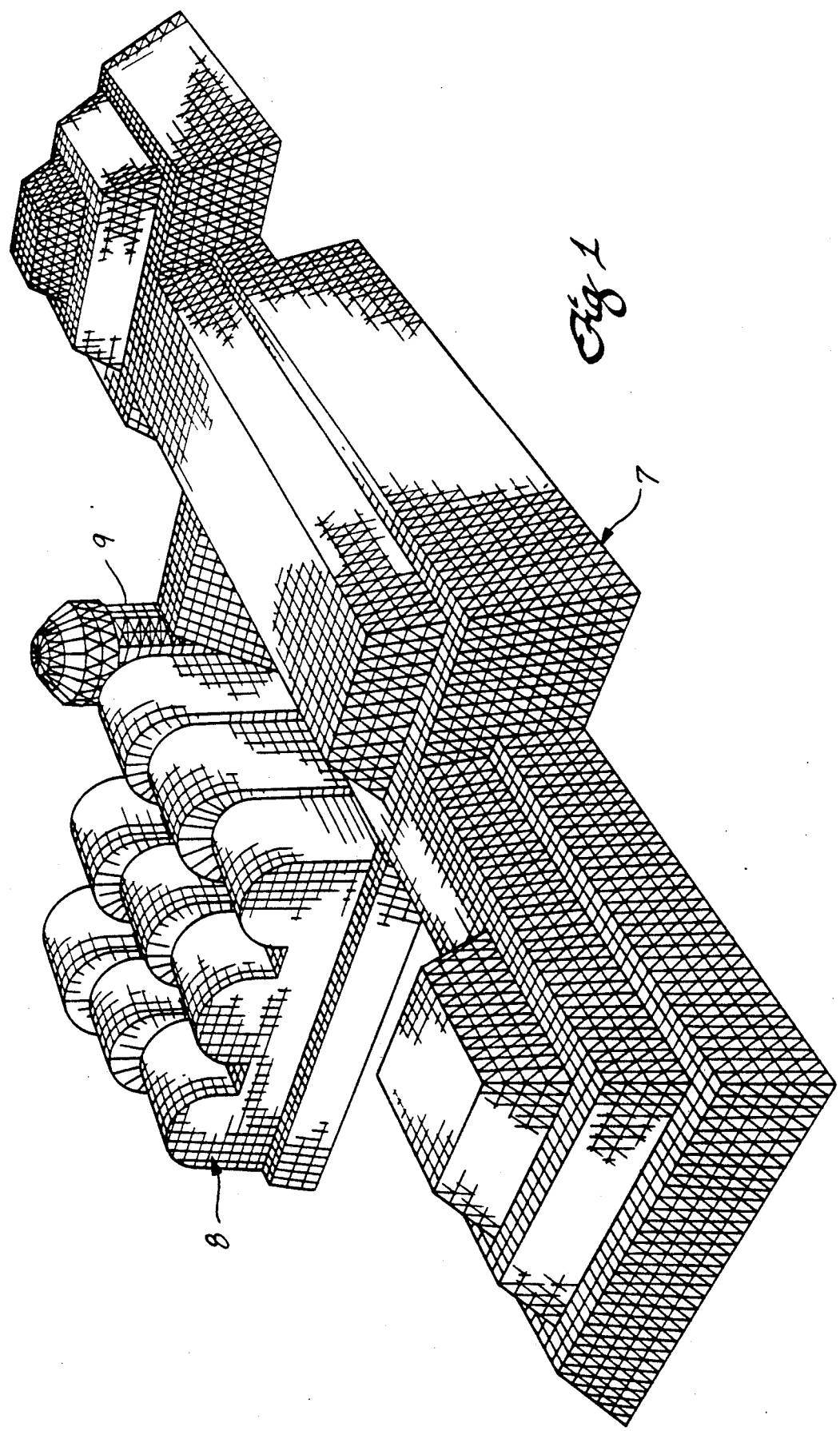
FIG. 1 is a perspective view of Biosphere II, a closed ecological system which may be sealed with a glazing system as provided in practice of this invention.

The basic structures of the Biosphere II closed ecological system comprises a concrete foundation on a gentle hillside with a tubular steel space frame 6 erected on the concrete foundation. The foundation includes a welded and leak-tested stainless steel sheath or pan embedded in the concrete to prevent transfer of air, water or other matter through the foundation. A large number of steel tubes are bolted together to form a rigid reticulated frame which is largely open space for minimum shadowing of the inside of the structure.

The major part of the above-ground space frame is covered with an array of glass panels wherein individual panes of glass have shapes corresponding to the open spaces between the steel tubes of the space frame. The joints between adjacent panes of glass overly tubular members of the space frame for minimum additional shadowing. All of the joints between the sheets of glass are tightly sealed by what becomes, in effect, a large continuous reticulated gasket following the line of joints. The glass is also sealed to the stainless steel pan in the foundation so that no air or other matter is transferred between the interior of the closed ecological system and the earth's environment.

There are three principal portions to the closed system. There is an elongated wilderness module structure 7 covering about 0.6 hectare. To one side of the wilderness module structure is an intensive agricultural module 8, which is normally open to the wilderness module, but which may be isolated in an emergency. On one side of the intensive agricultural module is a living habitat 9 where the occupants of the closed ecological system are housed. The occupants may traverse the entire system for agriculture, control, maintenance, and the like.

In an exemplary embodiment, the glazing for such a structure is supported on an extruded metal support bar 10, which has a box-like cross section for stiffness and may include condensation gutters 11 along its lower edge. Each support bar is, in turn, supported at its ends by a node plate 12, which is bolted to fins 13, extending upwardly or outwardly from a tubular space frame 14. The space frame is a conventional bolted assembly of tubes forming a structural network for supporting the glass of the glazing system.

In an exemplary embodiment where the node is in the corner between four sheets of glass, the node plate is a cruciform metal member typically bolted to two fins and merely resting on the other two fins of the space frame. There is a tongue 16 at the end of each of the four arms of the node plate. Each tongue fits into the end of the hollow box-like cross section of the respective support bar 10. Since the support bar is not rigidly fixed to the node plate, there can be limited motion between the node plate and support bar in response to thermal expansion, wind-loading stresses, or the like.

The node plate has four threaded studs 17 extending outwardly from the four arms, respectively, of the node plate. The studs extend through the node plate and are welded on the opposite side to be strong and leak-tight.

Figure 2:
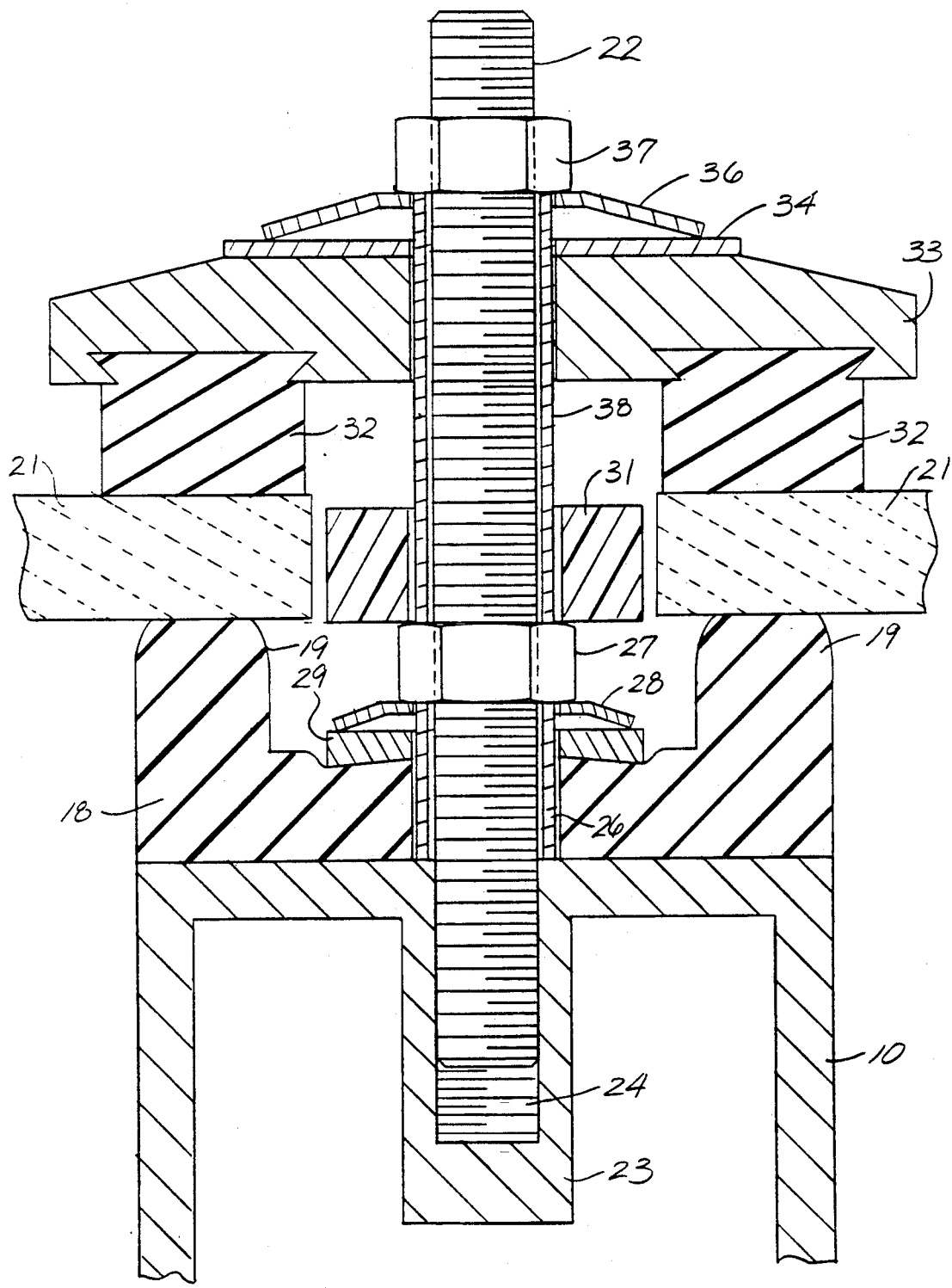
FIG. 2 is a fragmentary transverse cross section of the edges of two sheets of glazing material, a supporting member and gasket used on the closed system.

An extruded elastomeric gasket 18 extends along each support bar. Preferably the gasket is formed of a silicone rubber or the like, because of its high resistance to degradation despite exposure to the atmosphere, sunlight, etc. In transverse cross section, the gasket is generally U-shaped, with the end of each leg 19 of the U being semicircular. The end of each leg of the U-shaped cross section is illustrated flattened somewhat in FIG. 2 due to the deformation of the gasket that occurs where it bears against a sheet of glazing material 21. The glazing material may be sheet glass, transparent plastic, or preferably laminated safety glass.

The assembly of glass sheets, gasket and support bar is secured by way of a row of threaded studs 22 along the length of each support bar. The support bar has an internal "flange" 23. Blind holes 24 are drilled and tapped periodically along the length of the flange to provide a leak-proof mounting for the studs.

A rigid sleeve 26 fits around each stud where it passes through the base of the gasket 18. The sleeve acts as a spacer for a nut 27, which bears against a Belleville spring 28. The spring resiliently biases a washer 29 against the base of the gasket.

A somewhat soft ring 31, typically a relatively rigid plastic such as polypropylene or silicone rubber, is placed around the stud on top of the gasket clamping nut 27. The ring simply spaces the edges of the glass sheets away from the metal stud. Such rings may be used on a fraction of the studs in the assembly to space the glass from the studs.

The glass sheets 21 are pressed against the legs of the gasket by silicone rubber pads 32 which extend along the length of a metal clamping strip 33 outside of the glazing. The clamping strip is pressed toward the glass by a washer 34 engaged by a Belleville spring 36. The Belleville spring is biased against the washer by a nut 37 threaded onto the stud against the end of a spacer sleeve 38 on top of the gasket clamping nut 27.

All elastomeric materials exhibit some degree of compression set. Compression set is a failure of the elastomer to fully rebound after being compressed for a long time. To guard against deterioration from compression set of the rubber pads and legs of the gasket, the clamping strip 33 is secured by the Belleville spring 36. This type of spring has the property that it can maintain an approximately constant force over a range of distance. As the silicone elastomer loses its rebound over years of being under compression, it would tend to relax the air-tight seal between the gasket and glass. The Belleville spring, however, continues to maintain a constant force on the gasket, thereby overcoming relaxation due to compression set of the elastomer.

Because of the half-round ends on the legs of the U-shaped gasket and the loading by the Belleville spring 36, a good seal is maintained between the inner face of the glass and the gasket.

The same cannot be guaranteed between the gasket and support bar 10. Thus, there is a potential leak path past the base of the gasket and around a stud. The gasket compressing washer 29 provides a small barrier of compression of the base of the gasket around the stud, thereby blocking this potential leak path. Again, to assure that compression set of the gasket material does not open up this potential leak path after a period of years, the Belleville spring 28 provides a constant force against the compression washer.

The extruded U-shaped gasket bridges the gap between the edges of adjacent sheets of glass and seals against the inner face of the sheets of glass. Thus, there is a glass-to-gasket-to-glass seal between adjacent panels of glazing material, rather than the glass-to-gasket-to-metal frame typical in prior glazing structures. The direct glass-to-glass seal minimizes the potential sources of leakage and permits the resilient biasing of the gasket directly to the glass in all places, thereby substantially avoiding leakage.

To keep this seal all the way around the edge of the sheet of glass, provision must be made for a continuation of the gasket at the nodes adjacent to the corners of the sheets of glass.

Figure 3:
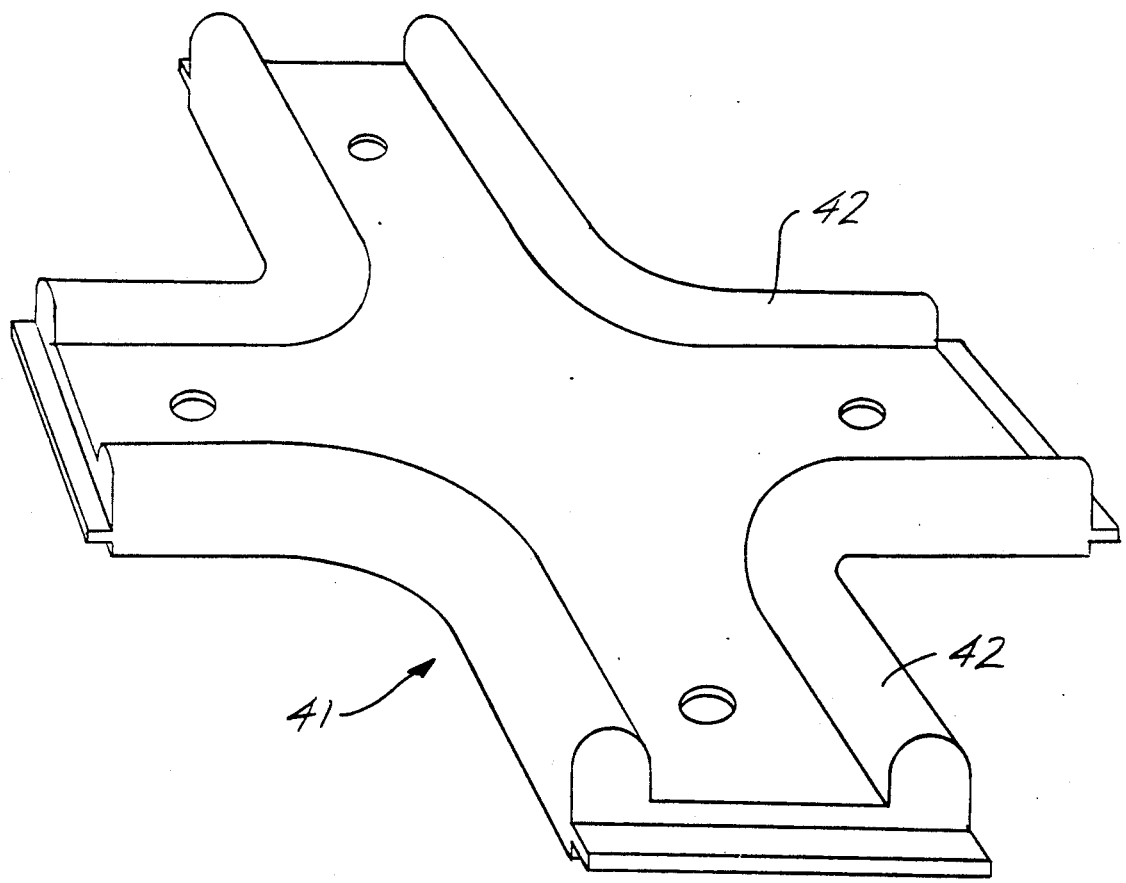
FIG. 3 is a perspective view of an exemplary portion of a gasket at the node between four sheets of glazing material.
Figure 4:
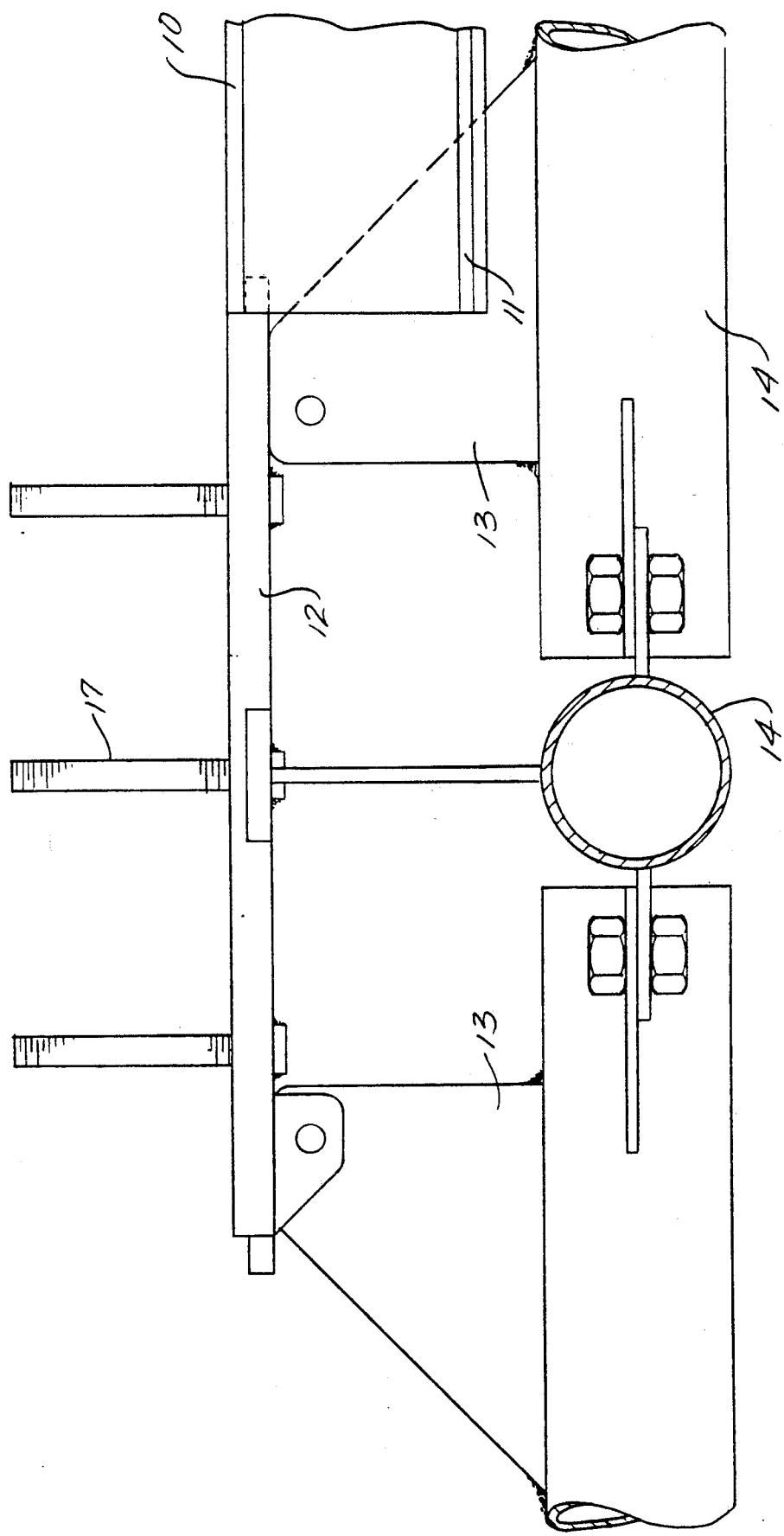
FIG. 4 is a fragmentary transverse cross section of one of the mounting of the support structure at a node between sheets.
Figure 5:
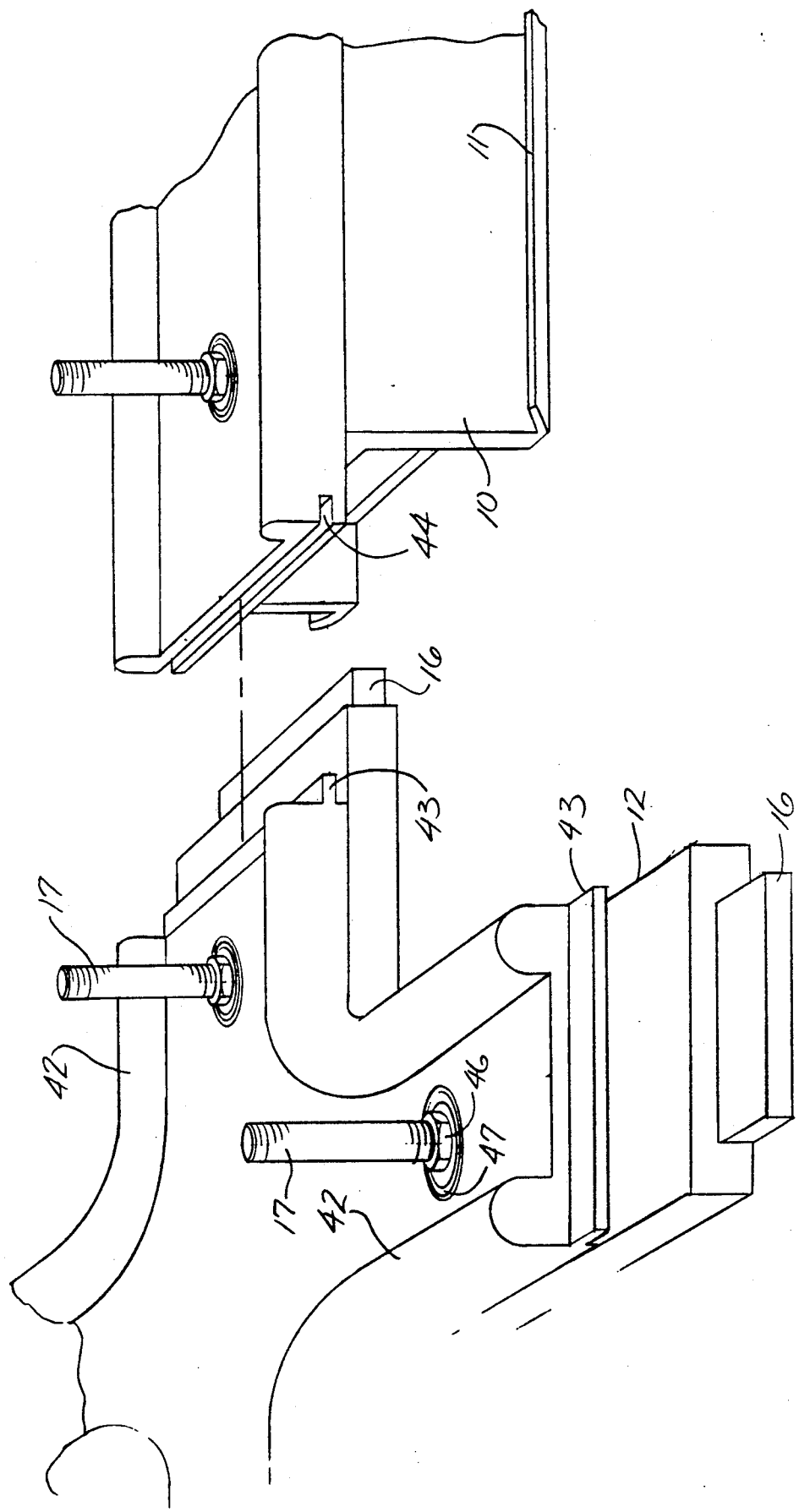
FIG. 5 is a fragmentary exploded perspective view of a joint at the node between sheets.

FIG. 3 illustrates an exemplary node gasket 41. Such a gasket is molded of a silicone elastomer the same as the elastomer of the extruded gasket. The exemplary node gasket has a cruciform shape for a simple corner where four sheets of glass in the same plane are adjacent to each other. Each arm of the node gasket has a pair of raised ribs 42 giving the arm the same transverse cross section as the U-shaped extruded gasket.

Each arm of the node gasket has a tongue 43 which fits into a corresponding slot 44 in the end of a mating extruded gasket. The tongue and groove arrangement keeps the crests of the ribs on the node gasket at the same height as the legs 19 of the extruded gasket. A small amount of lateral misalignment is not significant. A silicone adhesive is employed for bonding the ends of the arms of the node gasket to the ends of the respective extruded gasket. A thin joint line is used to assure that it is air-tight and close alignment is maintained. The properties of the bonding material are identical to those of the material used for the gaskets.

Figure 6:
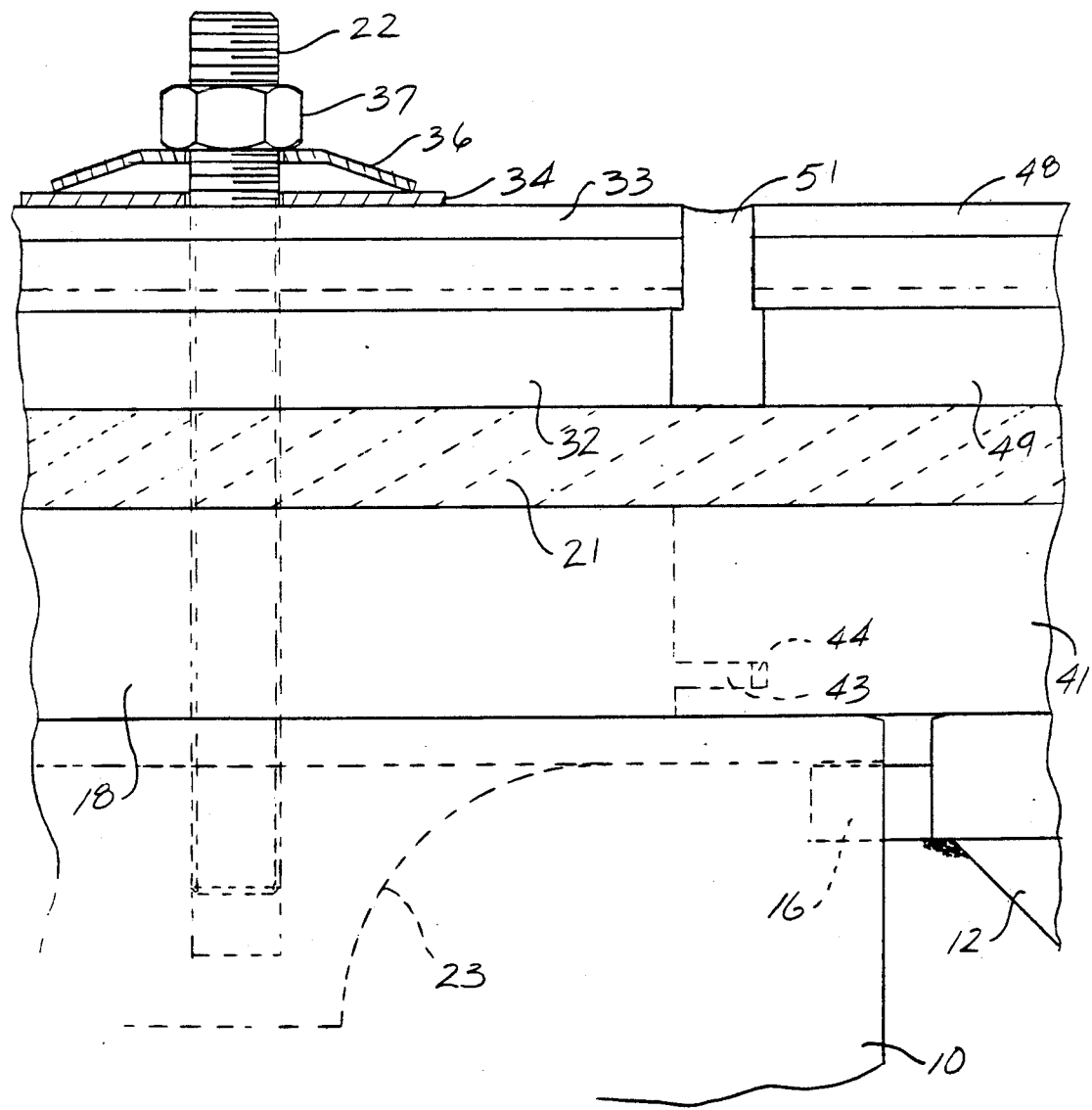
FIG. 6 is a fragmentary transverse cross section of an assembled joint.

The node gasket is secured to the node plate 12 by nuts 46 and Belleville washers 47 on the studs 17 in the same manner as the clamping of the extruded gasket to the support bar. Likewise, there is a cruciform clamping plate 48 (only one arm of which can be seen in FIG. 6) having a structure similar to the clamping strip 33 along the extruded gasket. Rubber pads 49 space the clamping plate away from the glass at the corner. The clamping plate is biased toward the glass by Belleville springs and nuts (not shown) threaded onto the studs 17 on the node plate. The studs may also be used for mounting structures on the outside of the glazing system, such as, for example, mounts for scaffolding for cleaning or repair of the structure.

When the clamping plate and clamping strip have been secured in place, the space between adjacent rubber pads 32 and 49 may be filled with a wet silicone adhesive 51 to provide a weather seal. This weather seal closes the communication between the space between the edges of glass sheets and the external environment, but is not relied on as being air-tight. Thus, the only remaining path between the space inside the seal and the external environment is around the spacer sleeve 38 and studs 17 and 22. Those joints may be largely closed by a conventional caulking material where it is desired to use the space around the edges of the sheets of glass for leak testing.

Part of the assembly of the glazing system is made in the shop. A node with its node gasket is completely assembled. Likewise, the support bar with its extruded gasket can be shop-assembled. Both of these can be leak-checked before going to the field. In the field, the nodes are bolted to the fins on the supporting space frame. The support bars are pinned to the space frame by way of slotted holes (not shown) near each end for support without restricting small motions due to thermal expansion, etc. Alternatively, one may bolt the support bars to the space frame between the nodes or, in some cases, the support bars may simply rest on the tongues of the nodes at each end of the support bar. Typically, the support bar is bolted to the space frame near the middle, so that any difference in thermal expansion is accommodated equally at the gaps between each end of the support bar and its adjacent node.

The ends of the extruded gaskets are then bonded to the adjacent node gaskets. When the bonding material is cured, the glass sheets are placed on what is now a continuous gasket. The clamping strips and clamping plates are assembled over the support bars and node plates, respectively, and the nuts 37 tightened against the Belleville washers that hold the clamping members in place.

Thermal expansion is permitted in every element of the support system for the glazing by the clearance gap between the ends of the support bars and the adjacent nodes. Small variations in alignment are also accommodated by the joints between the bars and nodes. The gap is small and is bridged by the silicone elastomer gasket, which is thick enough to be unaffected by variations in the gap. Thus, the expansion joint is completely inside the structure, and there is no requirement that it be sealed. Air is allowed to pass through the expansion joint and even to enter the space between the gasket and support bar. The only seals required are around the studs and between the edges of the gasket and the inner face of the glass.

Biosphere II is designed to have a positive internal pressure of about 1500 dynes per square centimeter (or about 1 mm of mercury) greater than ambient atmospheric pressure, so that any leakage of gas will be from the interior of the structure to the exterior. Any leakage would be into the space above the extruded gasket and beneath the clamping strip, or into a similar chamber over the node gasket. Communication can be readily provided into such spaces for detecting gas leaking from with the structure past the gasket. The leak detector is in communication with the space over the gasket, so that any leaking air must pass the detector.

Such leak detection may employ a trace gas such a helium. Alternatively, since the environment within the Biosphere II structure will normally have a higher relative humidity than the arid Arizona area in which it is situated, humidity in the space over the gasket may be employed for detecting the presence of leakage. Other differences between the internal and external gas compositions may be relied on for leak detection.

It is desirable to caulk the space between support bars and nodes, for example, for minimizing gas passage, so that the locus of leakage may be pinpointed. It is not necessary to have completely gas-tight blockage for adequate leak detection. Squirting the space full of silicone sealant from place to place will suffice.

One example of a glazing system having a glass-to-glass seal has been described and illustrated in detail. It is the simplest of the possible structures, in that adjacent panes of glass are in the same plane and the corners are right angles. It will readily apparent that corner nodes of other shapes may be used for joining adjacent corners of non-rectangular sheets of glass. One may make, for example, an X-shaped node plate and gasket with a pair of 120° included angles and a pair of 60° included angles for matching similarly shaped corners of sheets of glazing material. Three armed nodes may also be provided where three sheets of glass meet.

Figure 7:
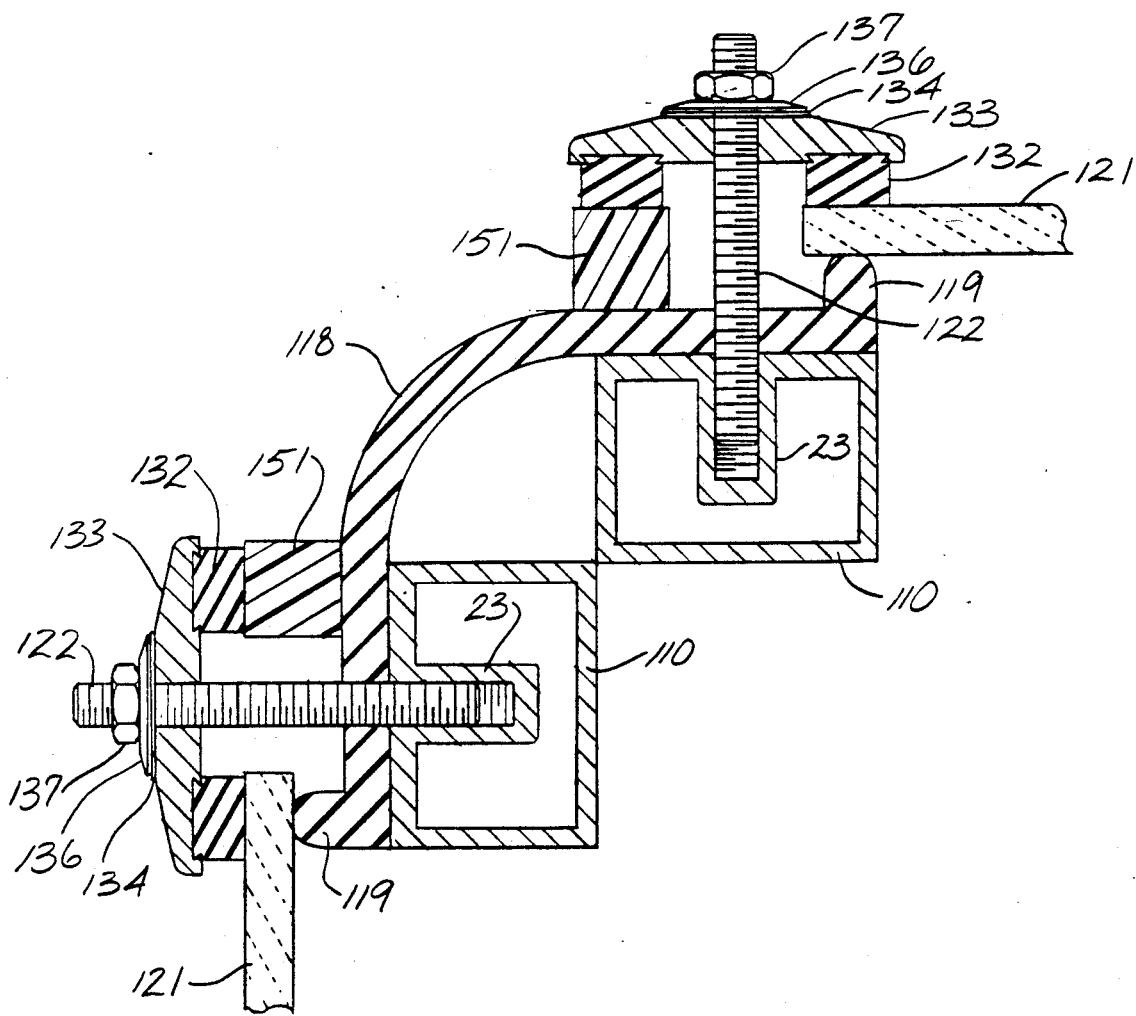
FIG. 7 is a cross section through an exemplary corner between adjacent sheets of glazing material.

Similarly, one can readily provide for a glass-to-glass seal where the planes of glass are not in the same plane. An example of a 90° corner is illustrated in transverse cross section in FIG. 7. Other angles, either convex or concave, may be provided by adaptations of this cross section. Since most of the parts in this embodiment are analogous to parts illustrated in the preceding embodiment, the same reference numerals are used, except increased by 100. Thus, for example, in the embodiment illustrated in FIG. 2, the glass sheet of a glazing system has reference numeral 21, and, in the embodiment of FIG. 7, this is represented with reference numeral 121.

In this corner joint there are parallel support bars 110 similar to each other and with their glass-facing surfaces at right angles to each other. The glass-to-gasket-to-glass seal in the corner joint is made with a gasket 118 having legs 119 which bear against the inner faces of the two sheets of glass 121 meeting at the corner joint. The gasket for this embodiment differs in that the base is much wider than in a joint that is all in a single plane. The base may be extruded flat and bent around the corner joint, or it may have a curved L shape in transverse cross section to curve the nearby support bars 110.

Each sheet of glass is resiliently biased toward the respective leg of the gasket by a respective clamping strip 133, washer 134, and Belleville spring 136 held in place by a nut 137. One of the rubber pads 132 under the clamping strip bears on the outside face of the glass, while the other rubber pad bears against a spacer 151 at the same height as the glass for maintaining symmetry of loading on the clamping strip. If desired, a corner molding having a general L-shape in transverse cross section may be fitted over the corner gasket to protect it from the elements. Such a corner molding may be metal or durable plastic.

Many other modifications and variations will be apparent to those skilled in the art. It will, therefore, be understood that, within the scope of the appended claims, the invention may be practiced otherwise than as specifically described.

What is claimed is:
1. A glazing system comprising
a metal frame structure having a first outer face in a first plane;
a first sheet of glazing material having an edge overlapping the first outer face of the frame structure;
continuous elastomeric gasket means between the first outer face of the metal structure and an inner face of the first sheet of glazing material for sealing against the face of the glazing material;
first means bearing on the opposite face of the first sheet of glazing material for resiliently biasing the sheet toward the first outer face of the metal structure;
a second outer face on at least one edge of the frame structure lying in a second plane;
a second sheet of glazing material having an edge overlapping the second outer face of the frame structure;
continuous elastomeric gasket means between the second outer face of the metal structure and an inner face of the second sheet of glazing material for sealing against the face of the glazing material; and
second means bearing on the opposite face of the second sheet of glazing material for resiliently biasing the sheet toward the second outer face of the metal structure,
wherein the glazing system further comprises:
a plurality of studs on the metal structure extending through each gasket means for supporting the first and second means; and
means for sealing the gasket means to the metal structure around each of the studs, comprising:
a ring surrounding each stud and bearing on the gasket; and
means for resiliently biasing the ring toward the gasket.

2. A glazing system as recited in claim 1 wherein the continuous gasket means collectively comprise a single elastomeric gasket bearing against the inner faces of both sheets of glazing material.

3. A glazing system as recited in claim 1 wherein the first and second planes are in a common plane.

4. A glazing system as recited in claim 1 wherein the gasket has a generally U-shaped transverse cross section and each leg of the U bears against a different sheet of glazing material.

5. A glazing system as recited in claim 4 wherein the end of each leg of the U-shaped cross section is half round for bearing on the face of the glazing material.

6. A glazing system comprising:
first and second sheets of glazing material having parallel adjacent edges;
an elongated elastomeric gasket having a generally U-shaped transverse cross section bridging the gap between the adjacent edges of the sheets of glazing material, the edge of one leg of the gasket bearing against a face of the first sheet of glazing material and the edge of the other leg of the gasket bearing against the face of the second sheet of glazing material; and
resilient means for maintaining the gasket in engagement with the faces of the sheets of glazing material wherein the system further comprises:
a stud passing through the base of the U-shaped gasket;
a compression ring surrounding the stud and bearing against the base of the gasket; and
means for resiliently biasing the compression ring toward the base of the gasket.

7. A glazing system comprising:
first and second sheets of glazing material having parallel adjacent edges;
an elongated elastomeric gasket having a generally U-shaped transverse cross section bridging the gap between the adjacent edges of the sheets of glazing material, the edge of one leg of the gasket bearing against a face of the first sheet of glazing material and the edge of the other leg of the gasket bearing against the face of the second sheet of glazing material; and
resilient means for maintaining the gasket in engagement with the faces of the sheets of glazing material wherein the first and second sheets of glazing material are in different planes and the base of the U-shaped gasket has a bend for extending in the directions of both sheets of glazing material.

8. A glazing system comprising:

first and second sheets of glazing material having parallel adjacent edges;

an elongated elastomeric gasket having a generally U-shaped transverse cross section bridging the gap between the adjacent edges of the sheets of glazing material, the edge of one leg of the gasket bearing against a face of the first sheet of glazing material and the edge of the other leg of the gasket bearing against the face of the second sheet of glazing material; and resilient means for maintaining the gasket in engagement with the faces of the sheets of glazing material wherein the means for maintaining the gasket in engagement with the face of a sheet of glazing material comprises:

a clamping strip extending along the edge of the glazing material;

a resilient pad between the clamping strip and the face of the glazing material; and spring means for biasing the clamping strip toward the resilient pad.

9. A glazing system as recited in claim 8 wherein the spring means comprises a Belleville spring and a washer disposed between the spring and clamping strip, and a spacer for fixing the location of the center of the Belleville spring, the spring having an edge bearing on the washer for exerting force on the clamping strip.

10. A glazing system as recited in claim 8 comprising a closed space between the clamping strip and the gasket for detecting leakage past the gasket into the closed space.

11. A glazing system as recited in claim 8 further comprising:

a support bar on the other side of the gasket from the glazing material, wherein the clamping strip is on the stud, and the spring means comprises a spring mounted on the stud.

12. A glazing system as recited in claim 11 further comprising a blind hole in the support bar for mounting the stud and means for providing a seal around the stud.

13. A glazing system as recited in claim 12 wherein the means for providing a seal around the stud comprises:

a compression ring surrounding the stud and bearing against the base of the gasket; and a Belleville spring for resiliently biasing the compression ring toward the base of the gasket.

14. A glazing system comprising:

first and second sheets of glazing material having parallel adjacent edges;

an elongated elastomeric gasket having a generally U-shaped transverse cross section bridging the gap between the adjacent edges of the sheets of glazing material, the edge of one leg of the gasket bearing against a face of the first sheet of glazing material and the edge of the other leg of the gasket bearing against the face of the second sheet of glazing material; and resilient means for maintaining the gasket in engagement with the faces of the sheets of glazing material wherein the means for maintaining the gasket in engagement with the face of a sheet of glazing material comprises:

a clamping strip extending along the edge of the glazing material; and a resilient pad between the clamping strip and the face of the glazing material wherein the end of each leg of the U-shaped cross section is half round for bearing on the face of the glazing material.

15. A glazing system comprising:

first and second sheets of glazing material having parallel adjacent edges;

an elongated elastomeric gasket having a generally U-shaped transverse cross section bridging the gap between the adjacent edges of the sheets of glazing material, the edge of one leg of the gasket bearing against a face of the first sheet of glazing material and the edge of the other leg of the gasket bearing against the face of the second sheet of glazing material; and wherein the system further comprises a node plate having a plurality of arms, each arm being aligned with a respective support bar; and a node gasket on the node plate and having a plurality of arms, each arm being bonded to a respective U-shaped gasket for forming a continuous gasket around the perimeter of each sheet of glazing material.

16. A glazing system comprising:

a plurality of sheets of glass;

a continuous elastomeric gasket bearing against one face of the glass around each sheet of glass for bridging and sealing the gap between adjacent sheets of glass; and means for resiliently biasing the glass and gasket together wherein the means for biasing comprises:

a support bar on the side of the gasket opposite from the glass;

a clamping strip extending along the support bar on the opposite side of the glass from the support bar; and spring means for biasing the clamping strip toward the glass, wherein the glazing system further comprises a resilient material between the clamping strip and each sheet of glass.

17. A glazing system as recited in claim 16 wherein the gasket comprises:

linear portions having a sealing surface on the face of each sheet of glass, each linear portion extending along an edge of a respective sheet of glass; and node portions having a sealing surface on the same face of the glass extending around each corner adjacent to the corners of the sheet of glass, the node portions being substantially continuous with the linear portions.

18. A glazing system as recited in claim 17 wherein the gasket has a generally U-shaped transverse cross section and each leg of the U bears against a different sheet of glass.

19. A glazing system as recited in claim 18 wherein the end of each leg of the U-shaped cross section is half round for bearing on the face of the glass.

20. A glazing system comprising:

a space frame comprising a plurality of frame members connected together to form a rigid reticulated frame;

a plurality of sheets of glazing material in an array on a space frame with the joints between adjacent sheet overlying frame members of the space frame; and a continuous reticulated gasket bridging the gaps between adjacent sheets of glazing material in the array, the edges of the gasket each bearing against an inner face of respective sheets of glazing material for sealing each sheet of glazing material to the adjacent sheets of glazing material, wherein the gasket has a generally U-shaped transverse cross-section and each leg of the U bears against a different sheet of glazing material, and the end of each leg of the U-shaped cross-section is half round for bearing on the face of the glazing material; and means for resiliently biasing the sheets of glazing material toward the gasket;

wherein the means for biasing further comprises:
resilient pads;
clamping members overlying the joints between adjacent sheets of glazing material and bearing on the resilient pads for in turn bearing on the outer face of the glazing material;
a plurality of studs extending from the space frame through the gasket; and
means for sealing the gasket around the studs and spring means on the studs for biasing the clamping members toward the glazing material.

21. A glazing system comprising:
first and second sheets of glazing material having parallel adjacent edges;
an elongated elastomeric gasket having a generally U-shaped transverse cross-section bridging the gap between the adjacent edges of the sheets of glazing material, the edge of one leg of the gasket bearing against a face of the first sheet of glazing material and the edge of the other leg of the gasket bearing against the face of the second sheet of glazing material;
resilient means for maintaining the gasket in engagement with the faces of the sheets of glazing material;
a support bar on the other side of the gasket from the glazing material;
a stud extending from the support bar through the base of the gasket;
a clamping strip on a stud;
a resilient pad separating the clamping strip from glazing material;
a first Belleville spring mounted on a stud and bearing on the clamping strip for biasing the clamping strip toward the glazing material;
a spacer for fixing the location of the center of the first Belleville spring;
a compression ring surrounding the stud and bearing against the base of the gasket;
a second Belleville spring bearing on the compression ring for resiliently biasing the compression ring toward the base of the gasket; and
a spacer sleeve around the stud for fixing a location of the center of the second Belleville spring.

* * * * *